Aug. 15, 1950     O. B. GRIFFIN ET AL     2,518,541
FISH STRINGER
Filed Feb. 18, 1948
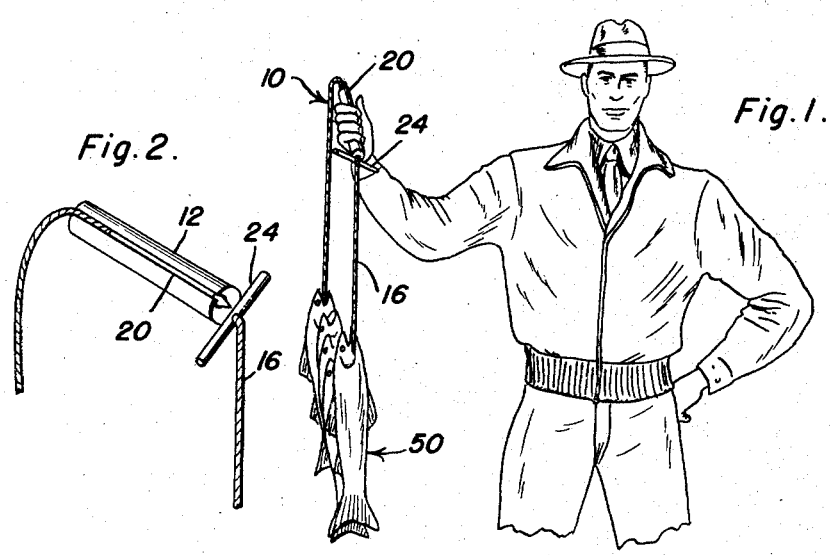
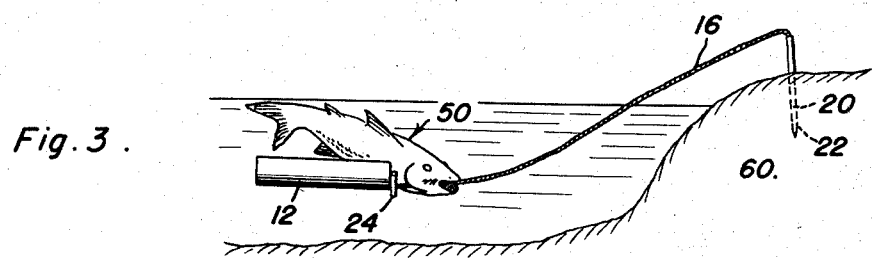
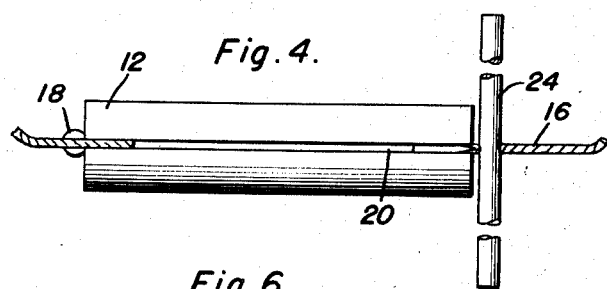
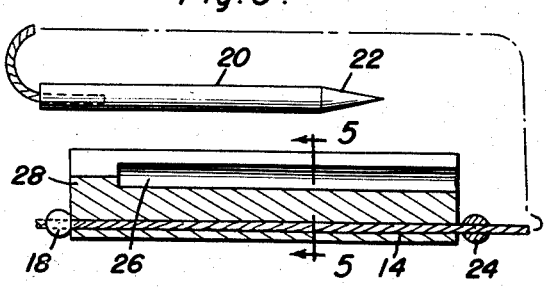
Oscar B. Griffin
Clyde E. Mayhall
        INVENTORS.

Patented Aug. 15, 1950

2,518,541

UNITED STATES PATENT OFFICE 2,518,541

FISH STRINGER

Oscar B. Griffin and Clyde E. Mayhall,
Marianna, Fla.

Application February 18, 1948, Serial No. 9,157

3 Claims. (Cl. 224—7)

This invention relates to an improvement in fish stringers, designed and adapted for use to retain or transport a number of fish thereby, and has for its principal object to conveniently and efficiently enable a plurality of fish to be transported and also to permit the fish to be placed within the water and securely retained in the placed or selected position.

Another object of this invention is to provide a device for stringing fish, that is inexpensive and composed of relatively few parts and would be economical to manufacture, and may be conveniently carried in a pocket or a like place, when not in use, and which is durably constructed and efficient in use.

A meritorious feature of this invention resides in the provision of a fish stringer comprising a body section, a flexible line secured thereto, a needle stringing element disposed on the opposite end of the line and a longitudinal grooved bore in the side of the body member, whereby the needle may be securely inserted within the body section, forming a continuous loop with the line, which renders the fish stringer highly advantageous and convenient for carrying the fish either in the hand or over the shoulder.

Another meritorious feature of this invention is the provision of the body section and the needle stringing element, being disposed at opposite ends of the flexible line, so that the needle element may be secured in a bank of a stream to serve as an anchor, thus allowing the body section and the fish on the line to remain in the water.

With these and ancillary objects and other meritorious features in view, this invention comprises certain novel features and arrangement of parts, as will become more apparent, as the following description proceeds, in view of the accompanying drawing, wherein:

Figure 1 is a perspective view of a fish stringer, constructed according to the principles of this invention, showing the fish stringer in use for transporting the fish;

Figure 2 is a view in perspective of the body member, having the needle stringing element detachably secured therein;

Figure 3 is a perspective view of the device, exemplifying the means provided to permit the fish to remain in the water;

Figure 4 is a top plan view of the body member, and cross bar, showing the needle stringing element inserted within the recess formed in the side of the body member;

Figure 5 is a cross sectional view taken substantially on the plane of lines 5—5 of Figure 6, and;

Figure 6 is a sectional view of the body member, with the needle stringing element shown in perspective.

Referring now more particularly to the drawing, wherein a preferred embodiment of this invention is illustrated by way of example only, and wherein similar characters of reference designate corresponding parts throughout, there is shown a fish stringing device, generally denoted by the character reference 10, constructed in accordance with the principles of this invention. The fish stringer comprises an elongated tubular body, 12, of any suitable diameter and length, depending upon the type of fish or the desire of the user and constructed of any material, preferably of aluminum or the like material and having a centrally disposed longitudinally extended bore disposed therethrough. The bore, 14, communicating with opposing ends of the tubular body 12 is adapted to receive therethrough a flexible line or cord 16. The flexible line 16, preferably comprising a resilient metal wire or some such sturdy material may be of any desired shape and of any desirable length. Suitable means are provided to secure the line 16 within the line receiving axial bore 14 and may comprise a head or a stop plate, 18, which is suitably secured to the line and in particular to the terminus of the line, which projects beyond one of the opposing ends of the body section 12.

A needle stringing element, 20, is disposed on the opposite end of the flexible line 16. The needle stringing element 20 comprises a tubular shank, having one end tapered or faired forming a pointed section 22. The opposite end of the needle stringing element has centrally disposed therein an axial bore, within which the terminating portion of the flexible line 16 is inserted and suitably secured by conventional means, such as, soldering or the like.

Transversely disposed on the flexible line or cable 16 and secured thereon adjacent the opposing end of the tubular body section 12 is a cross bar 24, having an axial bore transversely formed therein, midway the terminating portions thereof, through which is inserted a flexible cable or line 16. The cross bar 24 is secured on the line or cable by suitable means, such as, soldering, and may comprise either the soldering of the line directly to the outer sides of the cross bar or the provision of intervening stop plates or washers, which are soldered respectively to the line and cross bar.

Suitable means are provided in the body section 12, whereby the needle engaging element 20 may be securely inserted and locked within the body section, thereby forming a continuous line element or fish stringer. The means preferred comprises a longitudinal groove, 26, formed in the side of the body section 12, and gradually tapering inwardly. An upstanding or upraised seat portion 28 is formed at one end of the groove or recess 26 to accommodate the faired end or terminating point 22 of the needle stringing element 20, which as the needle is inserted within the groove moves upon the raised seat portion 28. The groove is of a suitable diameter, approximate to that of the needle 20, so that the needle 20 is frictionally held within the recess.

Thus, it can be seen, with reference to Figure 1 of the drawing, wherein the fish stringer 10 is shown in use as a transferring or conveying medium for transporting a fish 50 that the needle stringing element 20 is inserted through the gills or heads of the fish and the fish, 50, are then held securely on the line 16. The needle engaging element is then inserted within the longitudinally extending housing or recess 26 formed in the body section 12, so that a continuous fish stringer is achieved. The fish are then transported by using the tubular body section 12 as a handle member, as shown in Figure 1.

With reference to Figure 3, when it is desired to permit the fish to remain within the water, the needle engaging element 20 is inserted through the gills or heads of the fish, as aforestated, such method of stringing fish comprising the conventional and customary manner of securing fish on a line, and the needle element 20 is then staked or secured within the ground 60, permitting the fish 50 and the body section 12 to remain in the water and to be securely held within the place positioned.

Of course, it is to be understood that the materials to be used may comprise any suitable or desired materials, for instance the cord is preferably made of a heavy metal wire, but may be made of cotton or other flexible materials, and the needle and body section are preferably made of aluminum but may be made out of hard steel or other suitable materials.

Since other modifications and purposes of this invention will become apparent to those skilled in the art upon a perusal of the above description, in view of the accompanying drawing, it is to be understood that certain changes in size, style and structure may be effected without departure from the spirit of the invention and within the scope of the appended claims.

Having described the invention, what is claimed as new is:

1. A fish stringer comprising an elongated body, having opposing end walls and an axial line receiving opening extending longitudinally therethrough and communicated with the opposing end walls of the body, a flexible line having one end inserted through the opposing ends and received in the opening, means disposed on the inserted end of the line and engageable against one of the end walls for retaining the line within the opening, an elongated stringing needle having a faired terminus disposed on the other end of the line, a cross bar disposed securely on the line and bearing against the other of the end walls of the body section, and means for frictionally retaining the needle within the body.

2. A fish stringer comprising a cylindrical body, having opposing end walls and an axial line receiving opening extending longitudinally therethrough and communicated with the opposing end walls of the body, a flexible line having one end inserted through the opposing end walls and received in the opening, means disposed on the inserted end of the line for anchoring the inserted end of the line within the opening, an elongated stringing needle having a faired terminus means formed in said needle for receiving the other end of the line, a cross bar disposed securely on the line and bearing transversely against the other end wall of the body section, and means for frictionally retaining the needle in the body, said means including a longitudinal groove formed in the side wall of the body and communicated with the opposing end walls thereof.

3. A fish stringer comprising a cylindrical body, having opposing end walls and an axial line receiving opening extending longitudinally therethrough and communicated with the opposing end walls of the body, a flexible line one end of the line being inserted through the opposing end walls and received in the opening, a stop member disposed on the inserted end of the line and adapted to abut against one of the end walls of the body for anchoring the inserted end of the line within the opening, an elongated stringing needle having a faired terminus disposed on the other end of the line, a cross bar disposed securely on the line and transversely bearing against the other end wall of the body section, and means for frictionally retaining and concealing the needle in the body, said means including a longitudinal frictional groove formed in the side of the body and communicated with the opposing ends of the body.

OSCAR B. GRIFFIN.
CLYDE E. MAYHALL.

REFERENCES CITED

The following references are of record in the file of this patent:

UNITED STATES PATENTS

| Number | Name | Date |
| --- | --- | --- |
| 878,626 | Guilford | Feb. 11, 1908 |
| 1,176,177 | Sparks | Mar. 21, 1916 |
| 1,417,759 | McNiece | May 30, 1922 |